United States Patent [19]

Destuynder et al.

[11] Patent Number: 4,706,902
[45] Date of Patent: Nov. 17, 1987

[54] ACTIVE METHOD AND INSTALLATION FOR THE REDUCTION OF BUFFETING OF THE WINGS OF AN AIRCRAFT

[75] Inventors: Roger Destuynder, Noisy le Sec; Jacques Bouttes; Philippe Poisson-Quinton, both of Paris, all of France

[73] Assignee: Office National d'Etudes et de Recherche Aerospatiales, France

[21] Appl. No.: 731,161

[22] Filed: May 6, 1985

Related U.S. Application Data

[63] Continuation-in-part of Ser. No. 522,258, Aug. 11, 1983, abandoned.

[30] Foreign Application Priority Data

Aug. 11, 1982 [FR] France .................... 82 13998

[51] Int. Cl.⁴ ................................. B64C 13/16
[52] U.S. Cl. ..................... 244/76 C; 244/195; 364/432
[58] Field of Search ............ 244/75 R, 75 A, 76 R, 244/76 B, 76 C, 191, 194, 195, 175, 177; 364/432

[56] References Cited

U.S. PATENT DOCUMENTS

| | | | |
|---|---|---|---|
| 3,020,006 | 6/1962 | Warren | 244/75 R |
| 3,184,188 | 5/1965 | Rossire | 244/194 |
| 3,236,478 | 2/1960 | Adams et al. | 244/191 |
| 3,240,447 | 3/1966 | Olshauser | 244/191 |
| 3,279,725 | 10/1966 | Andrew et al. | 244/191 |
| 3,347,498 | 10/1967 | Priestley et al. | 244/191 |
| 3,734,432 | 5/1973 | Low | 244/75 A |
| 3,902,686 | 9/1975 | Wykes et al. | 244/191 |

FOREIGN PATENT DOCUMENTS 46875 7/1981 European Pat. Off. .

*Primary Examiner*—Galen Barefoot
*Attorney, Agent, or Firm*—Larson and Taylor

[57] ABSTRACT

To reduce buffeting caused by separation on the wings of an aircraft, a parameter representing the buffeting in amplitude, frequency and phase is measured. The measuring signal is subjected to filtering intended to establish the characteristics of at least one mode of vibration of the wings and, by actuating a control surface according to a non-stationary law, in a localized region the wings, of alternate stresses are generated whose amplitude and phase are automatically determined to dampen one or several modes of vibration of the wings.

10 Claims, 8 Drawing Figures

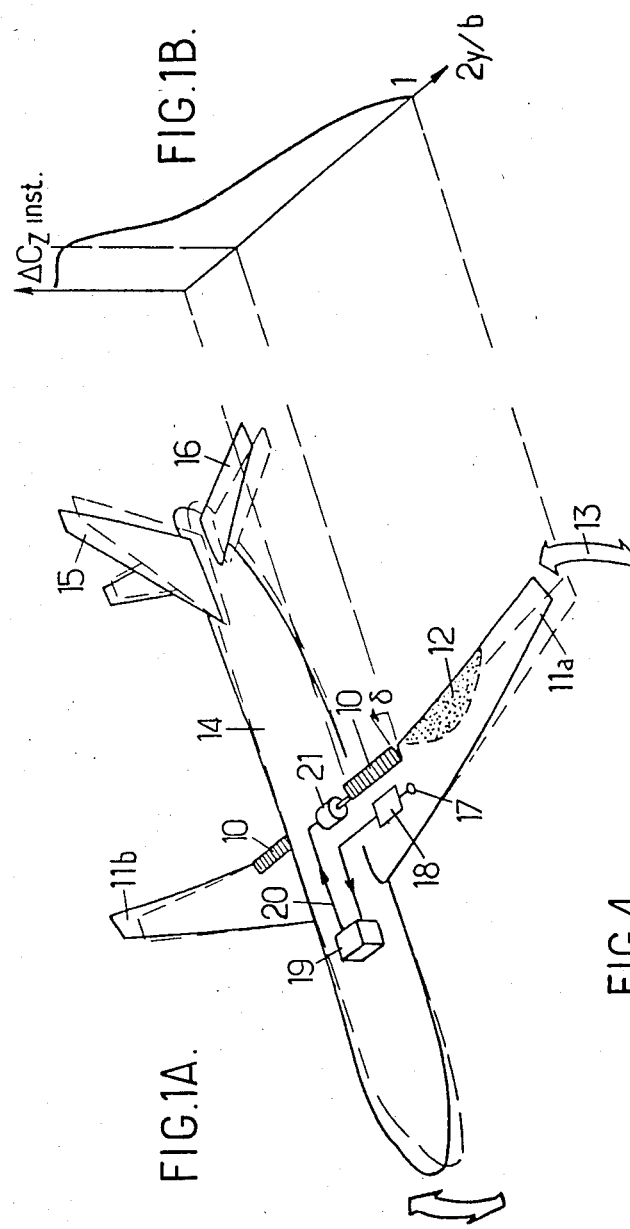
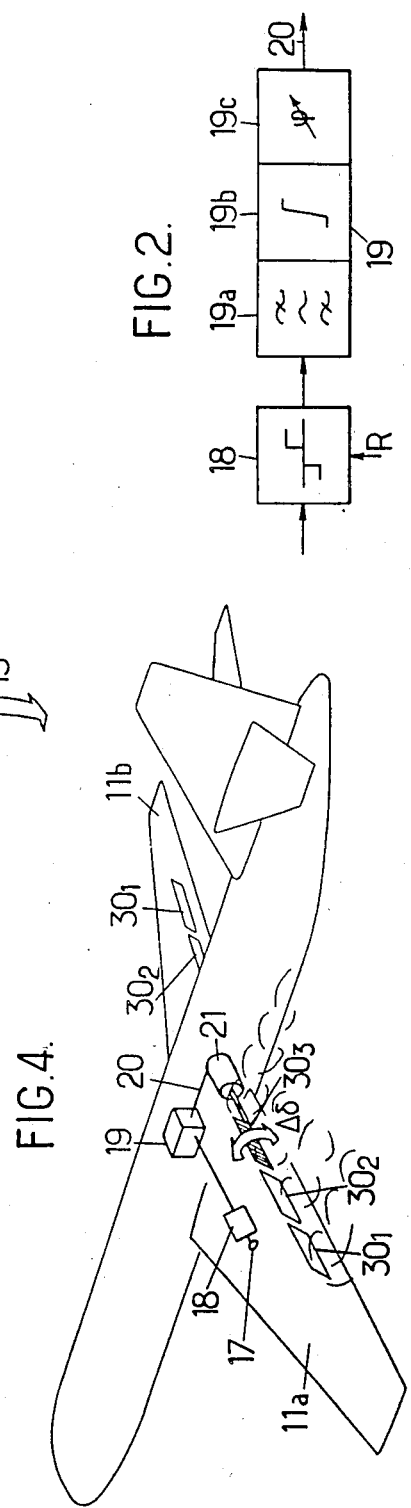

ACTIVE METHOD AND INSTALLATION FOR THE REDUCTION OF BUFFETING OF THE WINGS OF AN AIRCRAFT

This application is a continuation-in-part of application Ser. No. 522,258 filed Aug. 11, 1985 now abandoned.

BACKGROUND OF THE INVENTION

The invention relates to aircraft whose wings can exhibit buffeting under certain flight conditions.

The lfit surfaces of aircraft may become subject to phenomena associated with the coupling of the structure with the surrounding aerodynamic flow, and particularly flutter and buffeting.

Flutter is an oscillatory motion resulting from structural instability related to vibrational behaviour or airplane structures, particularly wings, in certain frequency ranges. It results from coupling of torsional and bending oscillation at different frequencies which induces regenerative oscillation of increasing amplitude at a predetermined frequency.

The response of an unstable structure may be computed since apparition of flutter is determined by structural and aerodynamical parameters which may be taken into account. It is also possible to determine a critical speed above which the aerodynamic forces induce structural motions of increasing amplitude. The airplane structure may consequently be designed for preventing occurence of flutter within the flight conditions likely to occur. If the required stiffness represents an unacceptable penalty, then active control of flutter, at least upon occurence of exceptional conditions, is necessary since flutter may cause catastrophic failure of a wing. Such active control has already been suggested. U.S. Pat. No. 3,734,432 discloses control of flutter with pairs of control surfaces for simultaneously countering the torsional and bending motions of the wing by applying torsional and bending forces to the wing with appropriate phases. Flutter is detected with sensors providing signals indicative of vibration amplitude, for instance accelerometers. Flutter cannot be damped with a single control surface and two mutually coupled control surfaces located at the leading edge and trailing edge, respectively, are required for creating torques and forces opposing the wing motion. Once particular mode only is corrected by each system and a number of sensors and flaps are required if a plurality of modes are to be damped.

Buffeting results in particular from unsteady separation arising on the wings and producing, through a coupling effect with the latter, vibrations of the structure of the aircraft. The phenomenon is not critical for the aircraft. However, it limits the flying domain of civil aircraft since the maximum level of buffeting is fixed by regulations. A reduction in the intensity of buffeting enables flight at a higher altitude and increase in the take off weight due to improved flight efficiency.

Buffeting is also detrimental to the flying performance of combat aircraft by limiting their manoeuvrability and their possibilities of firing.

Separations generating buffeting can appear at any flying speed. They are particularly accentuated at transonic speed since they are amplified by the oscillations of the shock waves. They also appear in flight at high angles of attack for a high value of the lift coefficient and on approaching stall conditions of the wings. Buffeting may also be caused by separations resulting from the airbrakes or spoilers used currently on aircraft to cause a loss in lift and rapid descent of the aircraft.

Buffeting is not due to regenerative oscillation of an unstable structure. It does not result into oscillations of ever increasing amplitude and does not represent an immediate structural hazard. It results from non-stationary flow separation occuring over limited areas on some parts of the wing. Separation takes place randomly and causes a forced oscillation of the wing at the natural vibration frequencies thereof. Oscillatory motion of the wing induces non-stationary pressure distributions on the whole of the wing and finally results in relatively low frequency, typically bending, oscillatory motion. A structure which is unstable will not exhibit buffeting, but rather flutter.

Buffeting is a phenomenon which has a large frequency spectrum. It may consequently be expected that control of buffeting will require detection in a large spectrum and filtering to retain only the oscillation modes to be dampened (rather than detection of an increasing oscillatory motion).

Attempts to reduce buffeting have up to now been made along two directions.

A first approach consists of increasing lift by a slight static action on the control surfaces.

A second approach consists of modifying the aerodynamic flow for avoiding separation by adapting the wing profile or providing vortex generators.

Such aproaches are difficult to implement. They only delay occurence of buffeting while they do not reduce its level. As a rule, they are only effective in respect of buffeting of a specific nature.

The inventors completely departed from the above approaches and explored a way which was apparently not possible in view of the broad frequency spectrum of buffeting; namely combatting the oscillatory effects of buffeting and damping the response of the structure. For that purpose, they had to analyze the separation phenomenon on a wing and to appreciate that there are in fact two effects:

a stationary phenomenon, which is indicated by a sharp change in the curve representing variation of the lift and of the moment vs. the angle of attack, a non-stationary phenomenon, constituted by a zone of non-stationary fluctuating pressures covering a very wide frequency spectrum. The area of this zone extends over the upper wing surface and the intensity of the pulsations in the separations increases with the attack angle.

For slight separations, only the stationary phenomenon is appreciable since the non-stationary force created by the randomly varying pressures remains too weak to energize the structure.

However, if the separation zone extends, the twisting torque of the non-stationary forces generates a forced excitation of the wings which respond all the more as their own modes of vibration necessitate minimal energy.

These vibration modes create their own field of non-stationary pressures, extended this time to the whole of the wings, which facilitates in particular low frequency modes such as alternate flexion (bending) of the wing at the fundamental frequency of the latter.

It is an object of the invention to reduce buffeting and, thereby, to improve the performance and, possibly, the comfort of aircraft by a process usable whatever the origin of buffeting.

The invention is based on a different approach, fully adapted to aircraft provided with a generalized automatic control system consisting of limiting and/or countering the influence of non-stationary pressures due to the vibrational movement of the wings.

GENERAL DESCRIPTION OF THE INVENTION

Accordingly, the invention provides a method for reducing the stresses due to buffeting of an aircraft wing, said method comprising: continuously measuring at least one parameter representative of the amplitude, frequency and phase of buffeting in an aircraft wing; generating an electrical signal representative of said parameter; subjecting said electrical signal to filtering for isolating the amplitude, frequency and phase of at least one mode of vibration of wing caused by buffeting; computing the value and variation of alternate forces to be applied in one localized region of the wing for damping at least said one mode of vibration, and generating said alternate forces by aerodynamic interaction by actuation of at least one control surface located in said localized region and also used for regular control of the aircraft in flight, said actuation being in the form of controlled oscillations having an amplitude significantly lower than the overall amplitude of movement of said control surfaces for stationary control.

Various parameters may be used, particularly those representative of the bending moment due to buffeting (strain in a spar for example) or of the motion (acceleration, for example).

According to another aspect of the invention, there is provided an installation for the reduction of buffeting of an aircraft wing element comprising local measuring means providing a signal representing the momentary value of a parameter connected (generally a dynamic stress) with the buffeting in the element and filtering and processing means for said signal to provide an actuating signal for an active control surface also fulfilling other functions, positioned on said wing element in a direction such that it damps the vibrations of at least one buffeting mode. An amplitude of oscillatory movement of ±1° will typically be sufficient. Preferably a plurality of buffeting modes will be simultaneously damped using specific modulus and phase laws for each frequency.

The measuring means may be of different types; they can be located at a single point or distributed: they will typically be situated at predetermined locations selected for the response of the detectors to the motion to be detected (for instance bending) to be of an order of magnitude greater than to the other movements (torsion for instance).

Appropriate locations may be determined by deformation tests on ground.

A bridge of strain gauges, an accelerometer, a non-stationary pressure detector are examples of suitable detectors.

The control surface used for countering buffeting may be arranged for being angularly or linearly movable. For instance, a linearly movable control surface may consist of a vane projecting out of the wing element by a variable amount.

We have found it much preferable however to use a control surface which is also used for normal control of the aircraft. It has been found possible to operate the control surfaces used for regular flight control and for damping buffeting according to different superimposed laws. The control surface is actuated according to a "static" or "steady" law, consisting in modifying the angular position of the surface (flap for example) with respect to the wing for attitude control. At the same time, an oscillatory motion at one or more frequencies is impressed about the "steady" position for countering buffeting. The oscillatory motion is selected for not having an influence on the action of the control surface as regards attitude control of the aircraft.

Since the installation operates in closed loop, it must respond to the criteria of stability of servo systems. In paractice, filtering and processing means may be analog or digital in nature. They will be generally arranged to filter the detected signal and select therein at least one mode of vibration of the wings, to integrate the signal obtained and to compute, from the integrated signal, a control signal which is delivered to drive means actuating the active control surface to give it an oscillatory motion effectively damping the vibrations of the wings.

Particular ones of the control surfaces may be selected to reduce the level of vibration depending on the flying speed and the origin of the vibration. However, with a swept-back wing, a control surface is preferably employed which is situated close to the root of the wing since the lift distribution along the span involves the whole wing and the effectiveness of the generated efforts is better distributed.

Among existing control surfaces, may be mentioned trailing edge flaps (inner ailerons, used for roll control at high speed), airbrakes and even leading edge control surfaces.

The airbrakes will only generally be used as control surfaces to reduce vibration when they are extended to reduce lift. They will then be actuated simultaneously according to two superimposed laws of control:

a "steady" law, i.e. an actuation of large amplitude intended to reduce lift (deflection of 0° to 60°) and a non-stationary dynamic law, i.e. oscillations of small amplitude, not exceeding about ±1°, at frequencies which are a function of the frequencies to be damped, which can range from a fraction of an Hz to 15 Hz approximately, about an average position imposed by the stationary law.

It is seen that one of the advantages introduced by the invention resides in the fact that the oscillations associated with the non-stationary dynamic law are of small amplitude and require a very low amount of energy from the power source.

In addition, since the oscillations of the aerodynamic surface are of slight amplitude, the control can be equipped with mechanical stops limiting movement thereof upon failure of the system.

It will be appreciated that the phenomenon whose consequences are countered by the invention, that it to say induced vibrations, is entirely different from the gusts or violent manoeuvres in a rough atmosphere which are unsteady phenomena of short duration, due to external disturbances. Buffeting is induced by aeroelastic coupling between the constant source of excitation consisting of separation of the airstreams over the wings and the natural modes (eigen modes) of the structure. It may persist during long periods of flight (approach or take-off, for example). The response to this excitation is stable and reproducible. Consequently, for particular flight conditions, i.e. predetermined mach member, altitude and incidence, the equations of control may be completely defined and provide modulus and phase adapted to attenuate to the desired extent that level of the disturbances, which is not the case for gust.

The results of tests carried out in a wind tunnel on a modern wing model designed for an aircraft cruising at $M=0.78$ at 9,000 meters (30,000 feet), at a normal incidence $\alpha=1.9°$ to 2° beyond which buffeting appears, may be given by way of example: the level of the stresses due to the dynamic bending moment of the first mode of wings bending oscillation at the most heavily loaded point of the wings was reduced by 90%. The second mode was attenuated by 60%, without modification of the flight characteristics of the aircraft in Cz or CM.

Control of buffeting was obtained with small amplitude oscillations of the selected control surface. The dynamic angle of oscillation to reduce the vibrational level by 90% were 30' at $M=0.78$ for an incidence $\alpha=4.5°$.

The invention will be better understood from the following description of particular embodiments given by way of example, with reference to the accompanyign drawings.

BRIEF DESCRIPTION OF THE DRAWINGS

FIG. 1A is a schematic diagram showing an aircraft equipped with a device according to a particular embodiment of the invention, the engines not being shown, FIG. 1B is a diagram representing the distribution, along the span of the wing, of the alternate stresses generated by an oscillating control surface, that it to say the variation of non-stationary lift, FIG. 2 is a block diagram showing the functions fulfilled by the processing circuit of the signal in the embodiment of the invention shown in FIG. 1A.

DESCRIPTION OF PREFERRED EMBODIMENTS

Figure 2A:
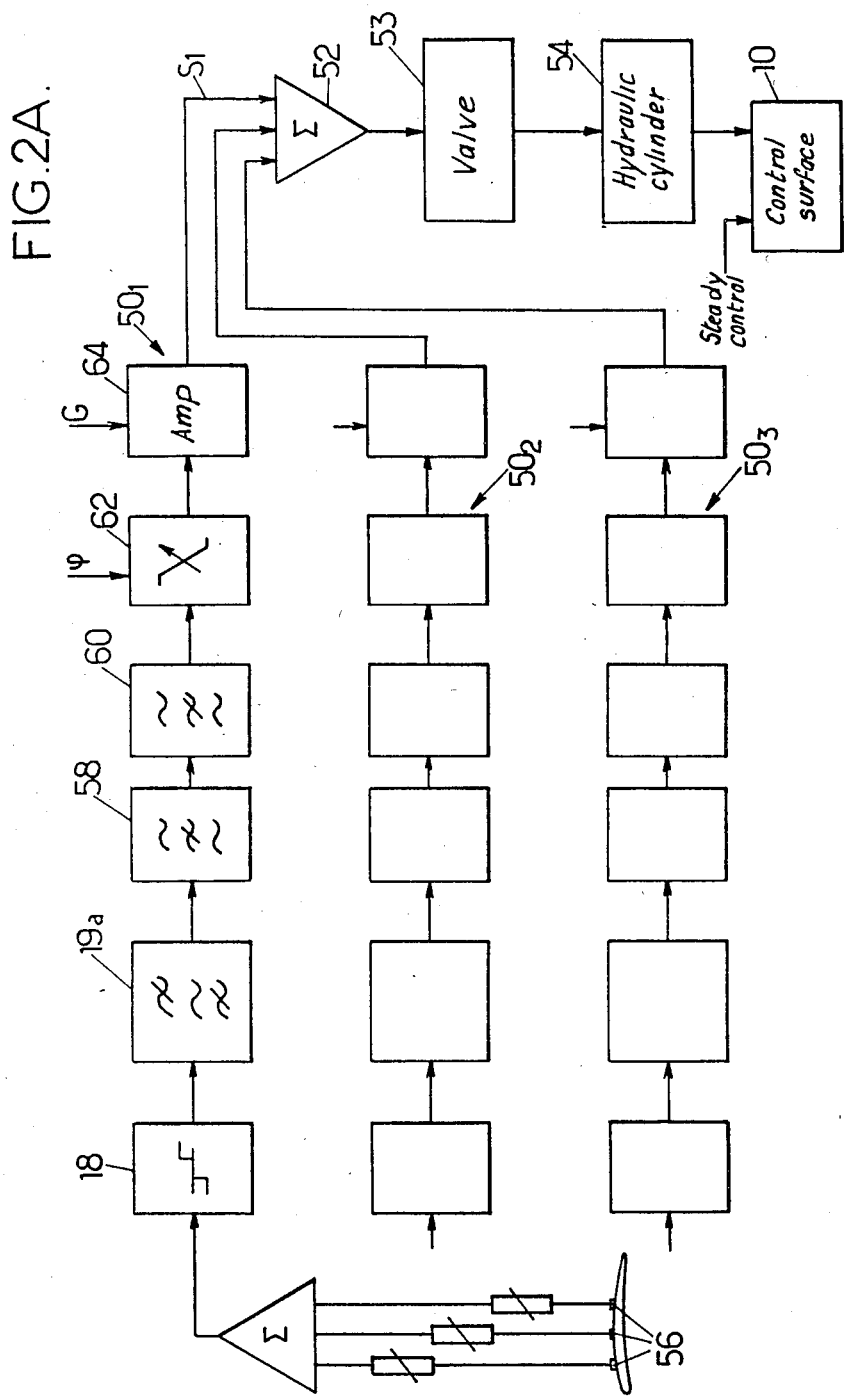
FIG. 2A is a schematic of the functions fulfilled by the signal processing circuits in a device according to the invention designed for countering buffeting at three frequencies (14, 24 and 40 Hz) corresponding to three natural modes of the wings.

Referring to FIG. 1, a typical passenger transport aircraft generally has a wing structure comprising two swept-back wings $11a$ and $11b$ provided with a plurality of movable surfaces. A frequent arrangement consists of providing along the trailing edge, from the root to the tip of the wing, successively, a first set of trailing-edge flaps or "flaperons", a control aileron for fast flight, a second set of flaps, then a slow speed roll-attitude control aileron. The upper surface of the wing bears in addition lift control spoilers, frequently arranged in front of the flaps. Only the inboard flaps 10 have been shown in FIG. 1A, with that incidence $\delta$ with respect to the midsurface of the wings $11a$, $11b$ which is given them during certain phases of flight.

During the same phases, a pulsatory separation zone 12 may appear and cause oscillation of the wing as shown, for the wing $11a$, by the double arrow 13 in FIG. 1A. This movement of the wing induces a vibrational movement of the whole of the fuselage 14, of the rudder 15 and of the stabilizer 16 of the aircraft, as shown diagrammatically in FIG. 1A by dashed lines. The overall vibration which results therefrom constitutes buffeting.

A device according to the invention comprises, for each wing, a detector 17 for measuring a parameter representative of the dynamic strain due to deformation of the wings. Detector 17 is, for example, a strain gauge stuck to the structure of the wing, for example, to a spar, in the vicinity of the root. This gauge is placed in a bridge which provides an electrical output signal representing all of the strains (static and dynamic) existing in the wing. Other types of detectors may be used, for example, in accelerometer or a non-stationary pressure detector of which the output signal is not affected by a D.C. component.

In a modified embodiment, the detector is located and arranged for delivering a signal which represents one oscillatory mode among all modes to be controlled. It will then be located on a nodal line of the torsion mode of flexure mode, that location providing a first filtering of the response of the structure emphasizing the selected mode.

The output signal from the detector is processed by a signal processing and computer system, which may be analog, digital or hybrid in nature. This system may include a circuit 18 with an adjustable threshold R, which only supplies an output signal when the value of the signal provided by the detector 17 exceeds a level higher than the normal vibration threshold of the wing. The threshold R may be adjustable, possibly automatically, to take into account various parameters, for example the weight of the aircraft.

Referring to FIG. 2, the signal derived from the threshold circuit 18 may be processed by computer means 19 which include a band pass filter 19a of which the pass band corresponds to the bending mode of the wing to be corrected. As a general rule, that mode is the fundamental bending oscillation frequency around an axis parallel to the roll axis of the aircraft. The filter 19a is followed by a pseudo-integrator circuit 19b designed to develop a signal representing the speed of the oscillating motion. Finally, a phase control circuit 19c develops a signal representing the correct phase to damp the motion, with an amplitude taking into account the characteristics of the aerodynamic surface used to reduce the level of buffeting.

FIG. 1B shows, for a lengthy swept-back wing of the type shown in FIG. 1A, the distribution of the damping force Cz derived from the non-stationary lifting forces generated by the oscillations of a control surface as a function of the ratio between the distance y to the root and the half-span b/2. The efficiency is best distributed span wise if control surfaces close to the root are used. As a consequence, as illustrated in FIG. 1A, flaperons 10 are used. Their incidence angle is controlled according to a stationary law for piloting under normal conditions; by juxtapositing a non-stationary law with the stationary law to damp vibration. As seen in FIG. 1B, which corresponds to a situation representing actual flight conditions of a current commercial airplane ($\Delta=1$ radian, $M=0.78$, $\omega R=0.18$) the inboard flaperons 10 are in a zone of maximum efficiency.

Each of the inboard flaperons 10 may be provided with a normal control member represented at 21, constituted, for example, by a hydraulic jack, associated with a valve controlled by solenoid pilot valves which receive the output signal of circuit 19. It is also possible to use electrical power means, although this is less frequent.

In general, the amplitude of the oscillations necessary to reduce buffeting is very small, of about $\pm 1°$. These oscillations may be obtained either by using those drive means 21 which serve for stationary control, or by adding additional drive means cascaded with the first.

Independent circuits 18 and 19 may be provided for each wing; however, it is possible to provide an overall system generating the orders necessary for the two wings and possibly combining them with the steady control. The same centralized system may be provided to actuate simultaneously (or separately depending on the flight conditions) several different aerodynamic surfaces, particularly to take into account flight conditions. The invention may be implemented in a generalized automatic control system.

Figure 3:
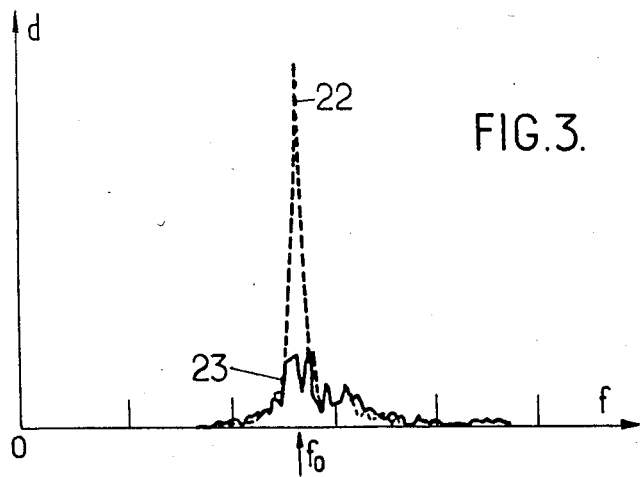
FIG. 3 is a diagram plotted from comparative tests carried out in an aerodynamic wind tunnel, showing the spectral density of the bending moment on the wing as a function of frequency, without the invention (dashed line) and with the invention (solid line), FIG. 4, similar to FIG. 1A, shows another embodiment of the invention, in which the alternate stresses applied to reduce the vibration are obtained by means of inboard airbrakes.

The results of tests carried out in a wind tunnel to check the validity of the method according to the invention are represented by the curves of FIGS. 3, which give the variation in the spectral density d of the bending moment as a function of frequency f.

The curve 22 is a representation of the results of tests on a conventional swept-back wing. The curve 23 shows the results of a test carried out by countering the buffeting of the same wing by stresses generated by an oscillating flaperon, controlled by a circuit responsive to the vibrations due to the first mode of bending oscillation of the wing. A flattening of the spectral density curve is noted, with especially almost complete suppression of the peak corresponding to frequency $f_0$ of the first vibrational bending mode of the wing.

More generally, the results obtained in the tests show that the invention enables a reduction of 70 to 80% of the dynamic amplitude of vibration of the wing due to buffeting to be achieved, whence a reduction in the dynamic fatigue of the structure of the aeroplane, improvement of comfort and increase of the flight domain. This result is achieved without any modification of the separation phenomenon, by reduction of the dynamic response of the wings.

Referring to FIG. 2A, there is illustrated a modified embodiment wherein the law of unstationary actuation of a control surface 10 is generated by a circuit comprising a plurality of channels, each dedicated to a particular frequency range. By way of example, it will be assumed that the channels $50_1$, $50_2$ and $50_3$ are designed for dampening the modes at frequencies of 14, 24 and 40 Hz respectively, each frequency corresponding to a natural mode of oscillation of the wings. The control signals delivered by the three channels are applied to a summing amplifier 52 whose output is connected to a servo-valve 53 for control of a hydraulic cylinder 54.

The three channels $50_1$, $50_2$ and $50_3$ have the same construction and the first channel only will be described in detail. Channel $50_1$ comprises three sensors 56 carried by the wing at locations selected for maximum sensitivity to buffeting at a frequency of 14 Hz. As in the embodiment of FIG. 2, the channel comprises a threshold circuit 18, preferably having an adjustable threshold, followed with a band-pass filter 19a (the components of FIG. 2A which have a counterpart in FIG. 2 being designated by the same reference numeral). Filter 19a is for instance selected for having a pass-band of from 10 to 18 Hz. The output of filter 19a is applied to rejection circuits 58 and 60 for rejecting frequency ranges centered on the frequencies dedicated to the other two channels. The channel then comprises two cascaded circuits 62 and 64 for generating an output signal, circuit 62 being for delaying the signal by a phase $\phi$ and circuit 64 for amplifying the signal with an adjustable gain G.

Channels $50_2$ and $50_3$ have the same construction, with the band-pass filter having frequency ranges of 20–30 Hz and 30–50 Hz, respectively.

The phase shift $\phi$ and gain G necessary for each channel may be determined by tests carried out on ground.

Operation of the embodiment of FIG. 2A is as follows.

First, the phase shift and gain G are determined taking into account the phase shifts introduced by each component of the channel and the damping action which is selected. The object to be fulfilled is to obtain an outut signal $S_1$ and a phase lag such that the force exerted by the control surface has a phase shift 90° with respect to movement of the wing.

As an example, some data relating to a passenger transport aircraft which is now in service may be given. It has been found that elements 19a, 58 and 60 of channel $50_1$ provide a cumulative phase shift of 50°. The phase shift due to the valve, hydraulic cylinder and generation of aerodynamic forces has been found to be 20°. Consequently, the total phase lag of a channel is 70°. For creating, with the control surface 10 consisting of a flaperon, a force which has a phase shift of 90° with respect to wing movement, the phase shift circuit 62 will be adjusted for providing a phase shift of $70° + 90° = 160°$.

The gain G is determined by computing the aerodynamic forces acting on flap 10 which tends to cause a phase shift between the real and the imaginary part of the unsteady excitation forces.

The gain is computed from the predetermined reduction in amplitude to be obtained. A relation exists between the overall gain, the value of the forces to be obtained and the various transfer functions for a predetermined frequency. If for instance the amount of vibration at 14 Hz is $\pm 5$ cm at a predetermined location and if that amplitude should be reduced to $\pm 1$ cm, gain G is computed taking into account the particulars of the elements which constitute the channel. Again, this has been done without any difficulty for the aircraft whose buffeting has been referred to with reference to FIG. 3.

In the embodiment shown in FIG. 4, the reduction in buffeting is obtained by control of the airbrakes. In FIG. 4 are shown for each wing airbrakes or "spoilers" $30_1$, $30_2$, $30_3$ shown in "open" position, that is to say forming with the middle plane of the wings an angle of 30° to 60° in general. When these airbrakes are thus open, they frequently cause a buffeting phenomenon which has repercussions on the wings and on the whole of the structure of the aircraft. To take into account the efficiency distribution, as illustrated in FIG. 18, it would generally be advantageous to use only the two inner airbrakes $30_3$ to counter buffeting. The closed loop control circuit may have a constitution similar to that shown in Figure 1A and include also a detector 17, a threshold circuit 18 and a circuit for processing the signal from the circuit 19. The control servomotor 21 of the inner airbrake $30_3$ receives, through the lead 20, the electrical control signal developed by the circuit 19. Once more, the amplitude $\Delta\delta$ to be given to the flaps around the average incidence δ is small, of the order of 1 degree.

The drive means for control according to a non-stationary law and their mode of control may be of very diverse nature, as has already been indicated above. The transmission of the detection and control signals is generally effected electrically, in analog and then digital form, although it is possible also to use optical transmission, for example as indicated in European Patent Publication No. 46,875.

Figure 5:
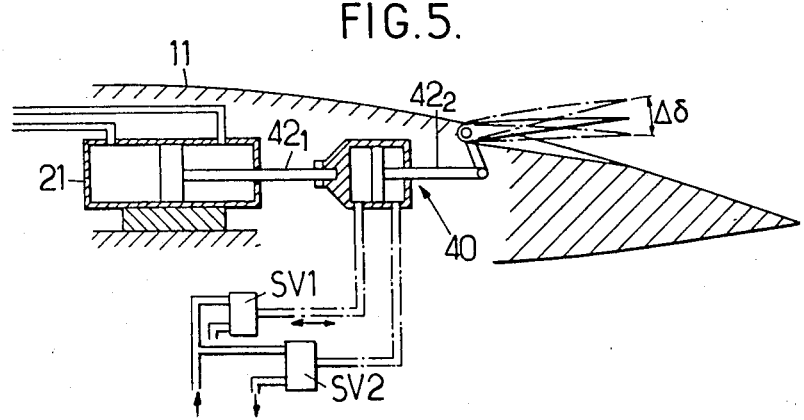
FIGS. 5 and 6 show two embodiments of the hydraulic control of an oscillating control surface for use according to the invention.
Figure 6:
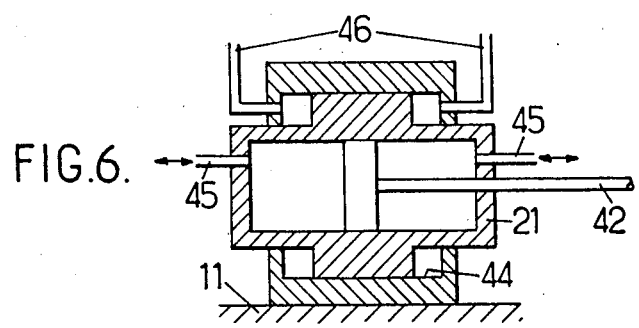

In the same way, the drive means for actuating the control surfaces may have very diverse constitutions. FIGS. 5 and 6 show two modifications which, the one and the other, have the advantage of limiting the amplitude of the oscillation motion intended to counter the buffeting, so that possible breakdown of the system has no other consequence than return to the flight conditions without damping of the buffeting, without dangerous consequence for the airplane.

In the case illustrated in FIG. 5, the device 40 for actuating the oscillating motion of amplitude $\Delta\delta$ is inserted into cascade with the stationary actuating jack 21 of the control surface 41. The device 40 includes a jack of which the cylinder is fast to a section $42_1$ of the actuating connecting rod of the control flap 41 connected to the movable member of the jack 21 and of which the cylinder is fast to a section $42_1$ connected to the movable member of the jack 21 and of which the piston is connected to the other section $42_2$ of the connecting rod. The intake and exhaust of liquid to and from the compartments of the double acting jack 40 may be controlled by servo-valves $SV_1$ and $SV_2$. The bottoms of the cylinder may constitute a stop limiting the movements.

In the case illustrated in FIG. 6, a jack for the stationary actuation of the control surface is again to be found of which the movable member moves the control surface through a connecting rod 42, this time in a single part. The intake and the exhaustion of fluid in the compartments of the jack are carried out through ducts 45 connected to at least one valve, generally piloted by servo-valves. The body of the jack 21 is mounted to slide, with a small displacement, in the bore 44 of an additional box fast to the structure of the wing. The non-stationary drive is obtained by the intake and exhaustion of fluid through pipes 46 controlled by servo-valves.

The invention is capable of numerous other embodiments, enabling one only or serveral modes of vibration of the wings to be countered. In all cases, the original solution provided by the invention is easy to put into practice, not laborious and very effective. It is applicable without the addition of supplementary movable surface.

We claim:

1. Method for reducing the stresses due to buffeting of an aircraft wing, said method comprising:
continuously measuring at least one parameter representative of the amplitude, frequency and phase of buffeting in an aircraft wing; generating an electrical signal representative of said parameter; subjecting said electrical signal to filtering for isolating the amplitude, frequency and phase of at least one mode of vibration of wing caused by buffeting; computing the value and variation of alternate forces to be applied in one localized region of the wing for damping at least said one mode of vibration; and generating said alternate force by aerodynamic interaction by actuation of a single control surface only located in said localized region close to the root of the wing and also used for regular control of the aircraft in flight, said actuation being in the form of controlled oscillation having an amplitude significantly lower than the overall amplitude of movement of said control surfaces for stationary control, said movement being impressed on said control surface in combination with said controlled oscillation.

2. In an aircraft having wings and active oscillatory control surfaces carried by said wings close to the roots thereof and deflectable for control under steady conditions of flight, an installation for reducing the strains cuased by buffeting in said wings, comprising:
at least two detectors each carried by one of said wings and delivering an electric signal representative of the magnitude, frequency and phase of a parameter associated with the stresses in the wing caused by buffeting, electrical filter means arranged to receive said signals and to extract therefrom filtered signals representative of a predetermined vibrational mode of said wings induced by buffeting; signal processing means connected to receive inputs including said filtered signals and arranged for delivering control signals to cause oscillatory movement of a single one only of said control surfaces on each of said wings, located on each said wing close to the root of the wing, in an angular range necessary for alleviating the stresses due to buffeting in addition to signals for static actuation of said control surfaces for piloting of the aircraft.

3. Installation according to claim 2, wherein processing means for said filtered signal include a pseudo-integrator and phase control means.

4. Installation according to claim 2, wherein said control surface is placed close to the root of the wing element.

5. Installation according to claim 2, wherein said filtering and processing means for said signal provides to said control surface an actuating signal according to a non-stationary law juxtaposed with a stationary law of static actuation.

6. Installation according to claim 5, wherein the control surface is constituted by a trailing edge flap and wherein the filtering and processing means of the said signal are provided to give said control surface a maximum amplitude of oscillation of the order of one degree.

7. Installation according to claim 6, wherein each of said detectors is a bridge of strain gauges.

8. Installation according to claim 2, wherein each of said detectors is an accelerometer.

9. Installation according to claim 2, wherein each of said detectors is a non-stationary pressure detector sensitive to an unsteady component of air pressure.

10. In an aircraft having wings and one active oscillatory control surface carried by each of said wings close to the roots thereof and deflectable for control under steady conditions of flight, an installation for reducing the strains caused by buffeting in said wings, comprising, for each wing:
a plurality of sets of detectors each carried by said wing, each set for delivering an electric signal representative of the magnitude, frequency and phase of a parameter associated with the stresses in the wing caused by a particular mode of buffeting at a predetermined frequency;

a plurality of electrical filter means each arranged to receive said electric signal from a particular one of said sets and to extract therefrom a filtered signal representative of the associated predetermined mode;

a plurality of signal processing means each connected to receive the filtered signal from one of said plurality of filter means and arranged for delivering a control signal used to cause oscillatory movement of only the said one active oscillatory control surface on each said wing in an angular range necessary to alleviating the stresses due to buffeting of the associated one of said modes;

and summing means for summing all of said control signals and applying the sum to drive means associated with only said one active oscillatory control surface in addition to a signal for static actuation of said one active oscillatory control surface for piloting of the aircraft

* * * * *